United States Patent
Apokatanidis et al.

(10) Patent No.: US 11,334,804 B2
(45) Date of Patent: May 17, 2022

(54) COGNITIVE MUSIC SELECTION SYSTEM AND METHOD

(71) Applicant: International Business Machines Corporation, Armonk, NY (US)

(72) Inventors: Dimitri Apokatanidis, Saint-Lambert (CA); Emmanuel Barajas Gonzalez, Jalisco (MX); Shaun E. Harrington, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 15/583,072

(22) Filed: May 1, 2017

(65) Prior Publication Data

US 2018/0314959 A1 Nov. 1, 2018

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | |
|---|---|---|---|
| 2011/0184539 A1 | 7/2011 | Agevik et al. | |
| 2011/0295843 A1* | 12/2011 | Ingrassia, Jr. | G06F 16/4387 707/723 |
| 2014/0277648 A1 | 9/2014 | Chong et al. | |
| 2015/0186780 A1* | 7/2015 | Zhang | G06K 9/00885 706/12 |
| 2015/0194151 A1 | 7/2015 | Jeyachandran et al. | |
| 2015/0297109 A1* | 10/2015 | Garten | A61B 5/375 600/544 |
| 2016/0371372 A1* | 12/2016 | Chong | H04H 60/33 |

* cited by examiner

*Primary Examiner* — Ann J Lo
*Assistant Examiner* — Van C Mang
(74) *Attorney, Agent, or Firm* — Scully, Scott, Murphy & Presser, P.C.

(57) ABSTRACT

A system and method for providing music track recommendations for a geographical location is disclosed. In one embodiment, the method includes receiving biometric data corresponding to one or more users in a geographical location from a biometric sensor and receiving environmental data corresponding to the geographical location from an environmental sensor. The method further includes determining an opinion of the one or more users with respect to a current music track being played in the geographical location based on an analysis of the biometric data and the environmental data, and providing an instruction relating to the current music track being played based on the determined opinion.

20 Claims, 5 Drawing Sheets

COGNITIVE MUSIC SELECTION SYSTEM AND METHOD

BACKGROUND

The present invention relates to a system for recommending music tracks to a group of users, and specifically to a system for analyzing user mood and ambient environment of a group of users, and recommending music tracks based on the analysis.

Music recommendation systems and services such as PANDORA, RINGO AND SPOTIFY are becoming an increasingly popular way for users to find and listen to music that may be of interest to them. Most of these music recommendation systems use four broad categories of inputs for their recommendations: (1) metadata such as artist, album, genre, etc.; (2) acoustic features such as beats, melody, etc.; (3) direct feedback from the users such as rating, manual selection or some other type of affirmative user action indicating the user's preferences (e.g., "like"); and (4) collaborative feedback such as information obtained from other users including purchasing patterns, listening patterns, and the like. A typical music recommendation system uses all or some of these inputs in various combinations. The most advanced recommendation systems typically use all of the above inputs and weigh their contribution to the music recommendation process. Nevertheless, these systems suffer from many disadvantages and shortcomings.

Liking or disliking a song is an expression of human mind. Since mood is an emotional state of human mind, it has an immense role in deciding when a person likes or dislikes something. The primary objective of a music recommendation system is to predict songs that a listener would like and hence it would be beneficial for a recommendation system to consider the mood of the listener when recommending songs. However, a major disadvantage of most prior art music recommendation systems is that they fail to consider a listener's mood. Furthermore, existing music recommendation systems and services such as the above are relatively inflexible in that they generally do not take into account the changing music preferences of users from moment to moment as they engage in different activities or enter different environments.

Finally, current recommendation systems do not take into account the integration of multiple user social interactions in a real-time manner for providing music recommendations.

Thus, a need exists for recommendation systems that overcome the above shortcomings.

SUMMARY

In an embodiment, a method for providing music track recommendations for a geographical location is disclosed. The method may comprise receiving biometric data corresponding to one or more users in a geographical location from a biometric sensor and receiving environmental data corresponding to the geographical location from an environmental sensor. The method further includes determining an opinion of the one or more users with respect to a current music track being played in the geographical location based on an analysis of the biometric data and the environmental data, and providing an instruction relating to the current music track being played based on the determined opinion.

In an embodiment, the instruction relating to the current music track being played may comprise a recommendation for a music track other than the current music track being played in the geographical location. The method may include playing the other recommended music in place of the current music track if the determined opinion is negative. Alternatively, method may include playing the other recommended music after the current music track if the determined opinion is positive or neutral. In an embodiment, the recommendation of the other music track may be based on at least one of the following: an overall mood in the geographical location or the scene description corresponding to the geographical location.

The biometric data may comprise at least one of a physical characteristic, a physiological characteristic, a behavioral characteristic, or any combinations thereof, of a user.

The environmental data may comprise at least one of location coordinates, data relating to weather conditions, visual data, audio data, ambient light, or ambient temperature, or combinations thereof.

In another embodiment, determining the opinion may comprise analyzing the biometric data and the environmental data to output a prediction of the opinion based on one or more learning models. In yet another embodiment, determining the opinion may further comprise analyzing user data corresponding to the one or more users.

In accordance with another aspect of the embodiment, a method for providing music track recommendations for a geographical location is disclosed. The method may comprise receiving biometric data corresponding to one or more users in a geographical location from a biometric sensor and receiving environmental data corresponding to the geographical location from an environmental sensor. The method may further include determining a current scene description for the geographical location based on an analysis of the biometric data and the environmental data, and providing a music track recommendation based on the current scene description. In an embodiment, the current scene description may include a categorization of the geographical location.

In an embodiment, the method may further comprise determining the current scene description further comprises analyzing user data corresponding to the one or more users.

The biometric data may comprise at least one of a physical characteristic, a physiological characteristic, a behavioral characteristic, or any combinations thereof, of a user.

The environmental data may comprise at least one of location coordinates, data relating to weather conditions, visual data, audio data, ambient light, or ambient temperature, or combinations thereof.

According to another embodiment of the disclosure, a system for providing music track recommendations for a geographical location is disclosed. The system may comprise a player device, a processing device, and a non-transitory, computer-readable memory containing programming instructions. In an embodiment, the programming instructions may be configured to cause the processing device to: receive biometric data corresponding to one or more users in a geographical location from a biometric sensor, and receive environmental data corresponding to the geographical location from an environmental sensor. The programming instructions may further be configured to cause the processing device to: determine an opinion of the one or more users with respect to a current music track being played in the geographical location based on an analysis of the biometric data and the environmental data, and provide an instruction relating to the current music track being played based on the determined opinion.

In an embodiment, the instruction may comprise a recommendation for a music track other than the current music track being played in the geographical location. The processing device of the system may cause the player device to play the other music track in place of the current music track if the determined opinion is negative. Alternatively, the processing device of the system may cause the player device to play the other music track after the current music track if the determined opinion is positive or neutral.

In an embodiment, the system may determine the opinion by analyzing the biometric data and the environmental data to output a prediction of the opinion based on one or more learning models. In yet another embodiment, determining the opinion may comprise analyzing user data corresponding to the one or more users.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Each of the terms "learning," "training,", "training data," and "learned model" refers to corresponding terms within the field of machine learning and neural network.

Figure 1:
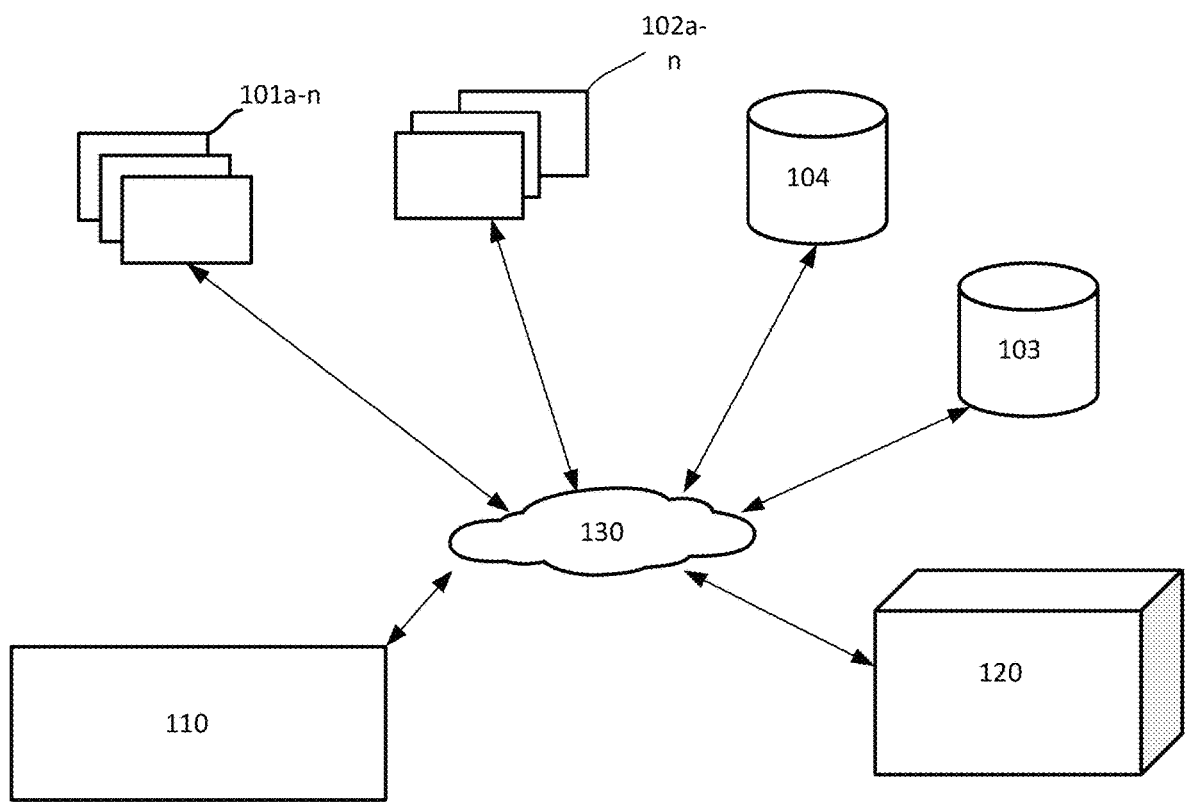
FIG. 1 illustrates is a functional block diagram of a computing environment for providing a music track recommendation based on user mood and ambient environment

FIG. 1 illustrates is a functional block diagram of a computing environment for providing a music track recommendation based on user mood and ambient environment, generally designated 100. It should be noted that while the following description discusses providing recommendations with respect to a single media track, it will be appreciated that recommendations corresponding to a playlist comprising more than one music track are within the scope of this disclosure.

In an exemplary embodiment, the system 100 includes one or more biometric sensors 101a-n, and/or one or more environmental sensors 102a-n, a music database 103, and a user database 104 in communication with an recommendation engine 110, via a network 130. The recommendation engine 110 uses one or more environmental sensors 102a-n and/or one or more biometric sensors 101a-n to collect data corresponding to a plurality of users in a given geographical location, and uses the collected data in one embodiment, optionally, in combination with personal data corresponding to one or more of the plurality of users to provide a music track recommendation to be played on a player device 120 in the given geographical location. The plurality of users may be individuals in a store, mall, hotel, club, wellness center, restaurant, public transport vehicle, car dealership, amusement park, convention center, museum, public space, or the like. In exemplary embodiments, computing environment 100 may include other computing devices not shown such as smartwatches, cell phones, smartphones, phablets, tablet computers, laptop computers, desktop computers, computer servers, fitness devices, or any other computer systems known in the art.

In some embodiments, network 130 may be a local area network (LAN), a telecommunications network, a wide area network (WAN) such as the Internet, or any combination of the three, and include wired, wireless or fiber optic connections. In general, network 130 can be any combination of connections and protocols that will support communications between the one or more biometric sensors 101a-n, the one or more environmental sensors 102a-n, the music classifier engine 103, the user database 104, the recommendation engine 110, and other computing devices.

In some embodiments, the one or more biometric sensors 101a-n are sensor devices configured to monitor biometric measurements of a user, for example, physical, physiological and behavioral characteristics. A person's physical characteristics include, but are not limited to, height, weight, gender, body type, skin tone, skin condition (e.g., smooth, wrinkled), tattoos, or presence/absence of hair (e.g., facial hair and/or baldness). A person's physiological characteristics include, but are not limited to, breathing pattern, the presence/absence of perspiration, body temperature, the presence/absence of skin tone (e.g., if the person's face is flush), heart rate, and pupil dilation. A person's behavioral characteristics include, but are not limited to, body language, body movement, body gestures, speech, facial expressions, eye movements, and gestures. The system, in some embodiments, uses biometric information to determine when a user likes or dislikes a musical selection. As a result, music can be automatically adjusted based, in part, on the user's behavior and mood. For example, according to various embodiments, when in a vehicle, such as a car, bus, truck, boat, airplane, etc., a song selection module can use information such as movements on the vehicle seats, pressure, temperature and humidity levels on the steering wheel or armrests, facial expressions, gestures, etc., to determine whether a user, such as the driver and/or a passenger in the vehicle, likes or dislikes musical selections. Users tend to provide implicit physical feedbacks when they like something, and these feedbacks can be measured using biometric sensors. Such feedbacks include, but are not limited to shaking one's body to the beat of the music and tapping a steering wheel when a user likes a song.

Various biometric sensors measure quantities including, but not limited to, voice level, pulse rate, hand temperature, facial expressions (e.g., happy/sad), eye movements, and body movements, including, but not limited to, tapping one's hands or feet, snapping fingers and bobbing one's head. Biometric sensors may include, but are not limited to, pressure, motion, pulse rate and/or temperature sensors, microphones and video and/or still image cameras located around the user(s). In an embodiment, one or more of the biometric sensors may be located in personal electronic devices used by a user, such as, for example and without limitation, cameras, microphones, motion sensors, etc. in a user's mobile device; heart rate monitor, temperature sensor, motion sensors, etc. in a user's fitness tracking device; various sensors included in a user's smartwatch; motion sensors included in a headset worn by a user; or the like. Alternatively, and/or additionally, various biometric sensors may be placed around the user(s) in a geographical location, such as for example, one or more sensors may be located, for example, in or on the dashboard, visor, rearview mirror, window, radio and/or at a user's feet in a vehicle.

In various embodiments, the one or more environmental sensors 102a-n are devices that are configured to provide data relating to the geographical location in which the player device 120 and/or the plurality of users are located. In some embodiments, the defined boundaries of the location may be the walls of a room, the exterior walls of a building or a section of a building. In some embodiments, the defined boundaries can be more generally defined, such as within an approximate city block, within a certain radius or zone. The zone may be relative to a map address, and may also include vertical or height (altitude) identification. Vertical of height identification may be useful if the location relates to identifying the floor or approximate floor in a multi-floor building. Examples of the one or more environmental sensors 102a-n include, without limitation, a global positioning system (for providing location coordinates and related information), a weather collection system (for providing data relating to current weather), one or more cameras (for providing visual data such as photographs or videos), one or more microphones (for providing audio data such as conversations), photosensors (for providing data relating to ambient light), thermometer (for providing data relating to ambient temperature), or the like. In some embodiments, the environmental sensors may be located in one or more personal electronic devices of a user, such as, for example and without limitation, mobile devices, smart watches, or the like. Alternatively, and/or additionally, various environmental sensors may be placed in the geographical location (i.e., not related to a user). Embodiments of the system use data relating to the geographical environment to determine the overall sentiment in a geographical location based on for example, conversations between people, characteristics of the geographical location, characteristics of a scene at the geographical location, or the like, and may use the data in conjunction with biometric sensor data to automatically provide music track recommendations. For example, some music may be better suited for particular times of the day, at particular locations, for particular activities or events, or the like.

In various embodiments, the user database 104 is a global user database that includes data that a system has available to it regarding a given user, from various sources, as may be processed. The user database may include a plurality of user records with each user record being associated with a user and documenting the user's activities. In one embodiment, each user record includes for example, user profile information (e.g., user name, IP address, device ID, demographic information, social-economic information, language preferences, or the like), user's location information, information relating to user's music preferences (e.g., music collections, created playlists, favorite songs, etc.), user listening history (e.g., play counts for each song in user music collection, skipped track history, what channels a user listens to and for how long, what the user's preferences are as reported via a user interface, etc.), user's social media activity (e.g., user hashtags relating to music, mood, etc., user feedback about music tracks), or the like. User preference data may be located anywhere, for example, locally on a smartphone or in a remote database, and can be harvested. Embodiments of the system may augment the biometric data and/or the environmental data with information about the users in a geographical location to provide music track recommendations.

In some embodiments, the user database may collect information regarding the users from, for example, user profiles associated with various social media platforms (e.g., email, TWITTER, FACEBOOK, etc.), music recommendation systems, user playlists on the user's devices, or the like. In certain exemplary embodiments, analysis of social media postings and interactions of each user can also be performed to learn additional relevant information that is not yet known about each of (i) the user, (ii) his or her particular social network, and (iii) his or her demographic or cluster. For example, the system may track the activity of a user on, for example, FACEBOOK, TWITTER, PINTEREST, WHATSAPP, GOOGLE+, chat rooms, online groups, etc., and other social media outlets where people may discuss a song, comment on somebody else's posting of a song, speak about related songs or other work of the same artist, or discuss different versions of a song as being preferred, such as, for example, acoustic, studio produced, or recording of a live performance, or original recording or a subsequent cover or remix, in order to gather information relating to preferences, perception of genre boundaries, similarities and affinities, for each user and his or her social circle(s) and demographic(s).

In another example, the user database may collect real-time information relating to a listener's opinion regarding music being played in a geographical location based on the listener's social media activity (while located in the geographical location), and use real-time information to analyze the current music selection in correlation with the listener. For example, a listener in a restaurant may praise the current music playlist on his/her FACEBOOK page which may be used as an indication of the user's preferences, mood, etc.

In various embodiments, a music database 103 is a collection of music tracks accessible by the player device 120. In an embodiment, the music database 103 may be in communication with, and may receive music tracks from various music databases (or content sources), such as, without limitation, local storage (e.g., various user devices), music streaming engines (e.g., PANDORA, SPOTIFY, etc.), radio stations, or the like. The music tracks may be associated with one or more metadata attributes. Attributes may include, but are not limited to, a song name, an album name, an artist name, a file reference, a genre, a comment, a year, a size, a tempo, a pitch, a last sung timestamp, a rating, a format, a song identifier, a vocal channel, a graphic channel, a start time, a duration, a track number, and the like. For example, metadata for a music track may include an "artist" tag, an "album" tag, "genre" tag, a "volume" tag, and/or "a beats per minute" (BPM) tag. The respective values of the tags can identify the recording artist, the album, the genre, the relative loudness, and the tempo of the song(s) or other content in the music track.

In some embodiments, the recommendation engine 110 uses the one or more environmental sensors 102a-n and/or the one or more biometric sensors 101a-n to collect data corresponding to a plurality of users in a given geographical location, and uses the collected data, optionally in combination with personal data corresponding to one or more of the plurality of users, to provide a music track recommendation to be played on a player device 120 in the given geographical location. A recommendation engine may take many different forms and may comprise, for example, but is not limited to, an embedded system, a distributed control system, a personal computer, a workstation, etc. The term "recommendation engine" as used herein is intended in its broadest sense as a device that includes at least one processor, and optionally further circuitry, memory, and/or logic, for controlling and/or providing at least some aspects of the music recommendation process described in this disclosure.

Figure 2:
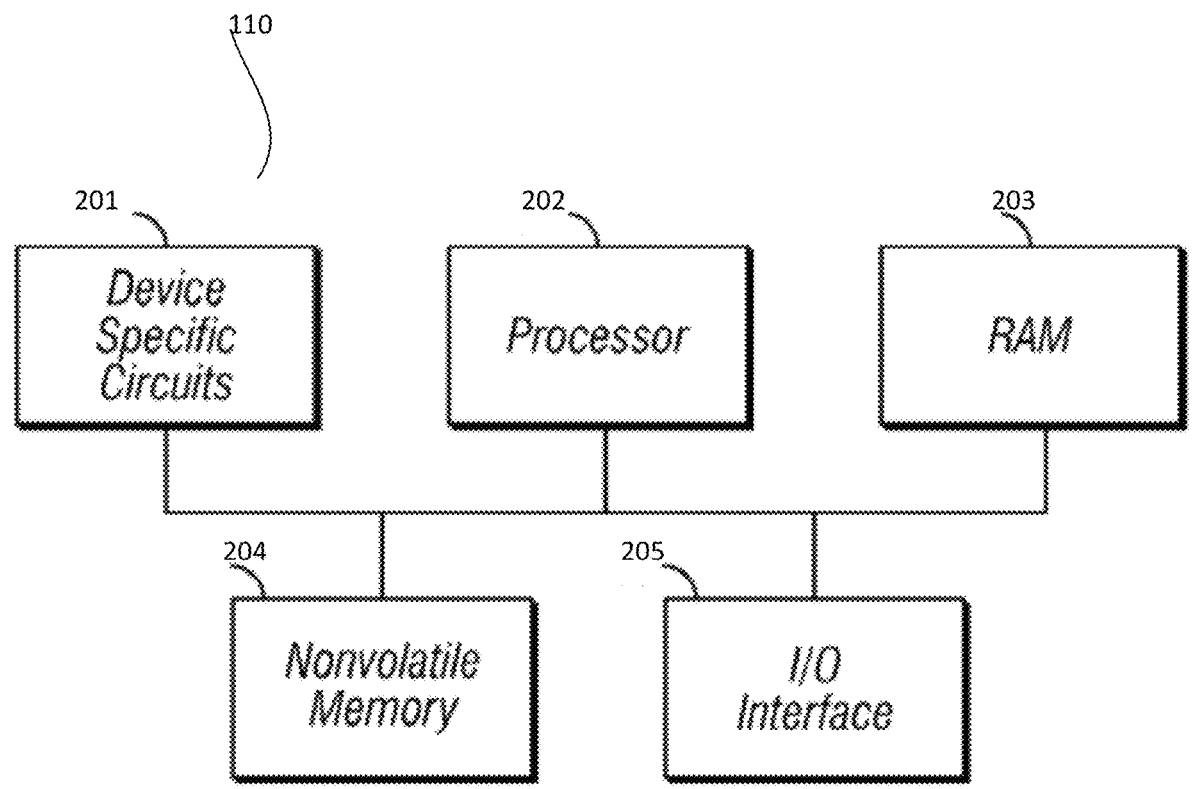
FIG. 2 is a block diagram depicting a recommendation engine configuration according to one embodiment.

Referring now to FIG. 2, a typical recommendation engine 110 is shown with a processor 202, Random Access Memory (RAM) 203, nonvolatile memory 202, device specific circuits 201, and input/output (I/O) interface 205. Alternatively, the RAM 203 and/or nonvolatile memory 204 may be contained in the processor 202 as could the device specific circuits 201 and I/O interface 205. The processor 202 may comprise, for example, an off-the-shelf microprocessor, custom processor, Field Programmable Gate Array (FPGA), Application Specific Integrated Circuit (ASIC), discrete logic, etc. The RAM 203 is typically used to hold variable data, stack data, executable instructions, etc.

According to various approaches, the nonvolatile memory 204 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 204 is typically used to hold the executable firmware and any nonvolatile data containing programming instructions that can be executed to cause the processor 202 to perform certain functions.

In some embodiments, the I/O interface 205 may include a communication interface that allows the processor 202 to communicate with devices external to the recommendation engine. Examples of the communication interface may comprise, but are not limited to, serial interfaces such as RS-232, USB (Universal Serial Bus), Small Computer Systems Interface (SCSI), RS-222 or a wireless communication interface such as Wi-Fi, Bluetooth, near-field communication (NFC) or other wireless interfaces. The recommendation engine 200 may communicate with an external device via the communication interface 205 in any communication protocols such as Automation/Drive Interface (ADI).

In an exemplary embodiment, in implementing the training (discussed below) on the aforementioned hardware, in one embodiment, the entire training data may be stored in multiple batches on a computer readable medium. Training data could be loaded one disk batch at a time, to the processor via the RAM. Once a disk batch gets loaded onto the RAM, every mini-batch needed for training is loaded from RAM to processor and this process repeats. After all the samples within one disk-batch are covered, the next disk batch is loaded onto the RAM and this process repeats. Since loading data each time from disk to RAM is time consuming, in one embodiment, multi-threading can be implemented for optimizing the network. While one thread loads a data batch, the other trains the network on the previously loaded batch. In addition, at any given point in time, there is at most one training and loading thread, since otherwise multiple loading threads may clog the memory.

Figure 3:
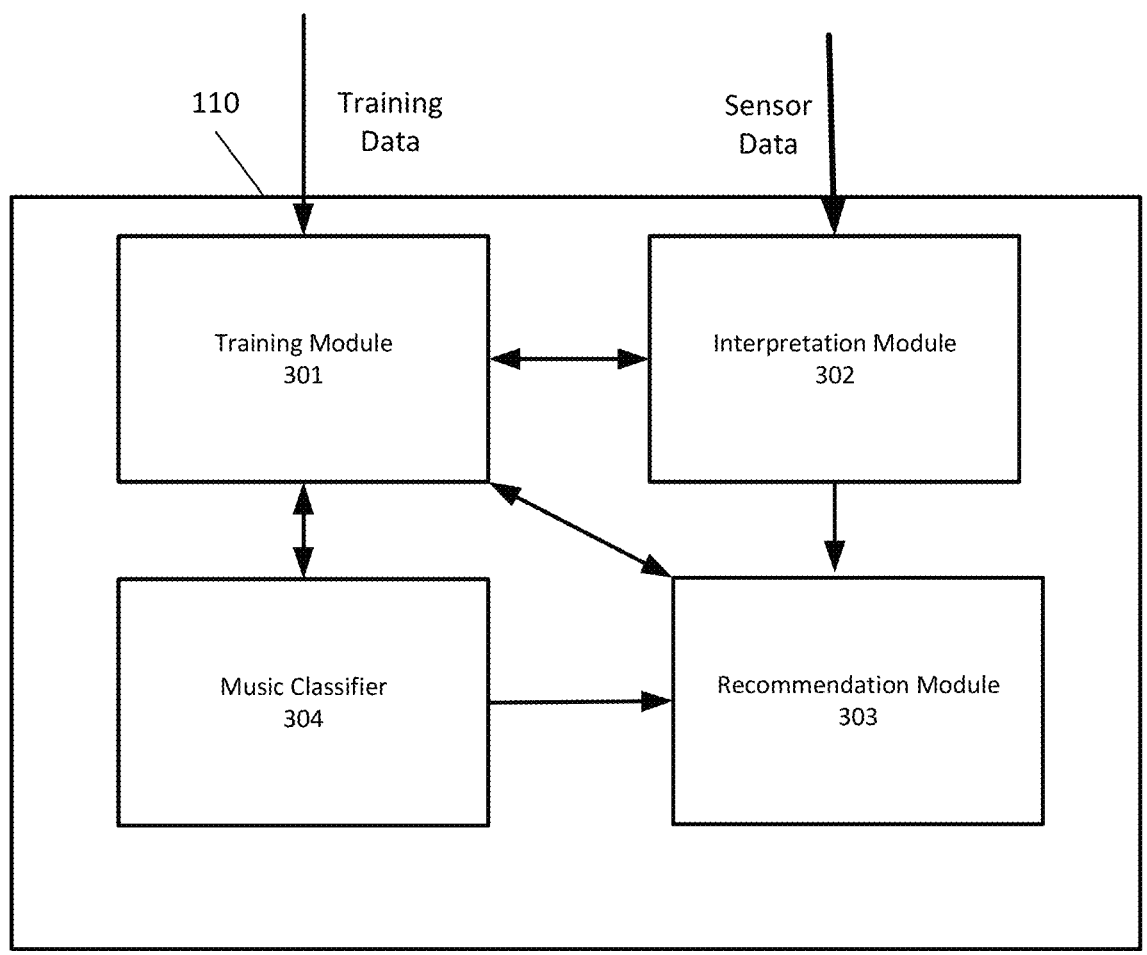
FIG. 3 is a functional block diagram illustrating various modules included in a recommendation engine, according to an embodiment.

FIG. 3 illustrates a schematic block diagram of various modules included in a recommendation engine 110. The recommendation engine 110 may include a training module 301, an interpretation module 302, and a recommendation module 303.

The training module 301 is configured to receive "training data" that includes data with certain known attributes. Examples of training data may include, without limitation, user moods with known attributes corresponding to biometric sensor data, environmental sensor data and/or user data (or vice versa); user opinions with known attributes corresponding to biometric sensor data, environmental sensor data and/or user data (or vice versa); musical selections a user likes and dislikes with known attributes corresponding to biometric sensor data, environmental sensor data, user data, moods, emotions, opinions, scenes, etc. (or vice versa); music track classification labels such as sad, happy, uplifting, etc. with known attributes corresponding to metadata associated with the music tracks; or the like. The training module 301 then analyzes the training data to create models ("learned models") that may be used to map inputs relating to attributes to outputs such as moods, opinions, musical selections, music classification labels, or the like.

Generally, a training module performs data analysis to identify hidden patterns and/or relationships in a data set and generates one or more learned models using one or more machine learning algorithms. Initially, the learned models are "untrained", but are "trained" by processing training data and generating information that defines the model. Specifically, a learned model is prepared through a training process in which it is required to make predictions and is corrected when those predictions are wrong. The training process continues until the model achieves a desired level of accuracy on the training data and is capable of mapping inputs to outputs. The generated learned models are then deployed for performing data analysis, for example, by providing predictions of future behavior based on specific past behavior. The training process may be based on supervised learning, unsupervised learning, and/or semi-supervised learning, as is known to those skilled in the art. Thus, the training module 301 may include one or more machine learning algorithms for training one or more learned models based on a corpus of training data with known attributes to create one or more learned models by processing the training data using pattern recognition techniques.

Furthermore, the training module 301 may be a learning system that takes feedback from various other modules of the recommendation engine (such as the interpretation module, recommendation module, and/or the music classifier module), and uses the feedback as training data to improve its accuracy over time with increased training.

In some embodiments, the training data may correspond to and/or include biometric data of a user(s) and the known attributes may correspond to the mood of the user(s), reaction of a user(s) to a music track, and/or the user's music selection (or vice versa). For example, the training module 301 may implement an initial training phase to learn what musical selections a user likes and dislikes under various biometric measurements, by using, for example, a machine learning algorithm as discussed above. In accordance with some embodiments of the system, data concerning what a user likes and dislikes can be input to a machine learning algorithm and processed using pattern recognition techniques to generate the learned models. In various embodiments, the data analyzed according to the machine learning algorithm during the initial training phase may include, but is not limited to, data from one or more biometric sensors (such as, cameras, microphones, thermal sensors, etc.) previously analyzed or categorized data results, the current music/song stream and/or environment data. Further, as discussed above, the training module 301 improves its accuracy over time. For example, if the system puts on a musical selection that it determined a user will like, and a user changes or cancels the musical selection selected by the system, the system can recognize that a potential mistake has been made, as indicated by the user changing the song. The machine learning algorithm then updates its parameters with new information as to what biometric measurements indicate a desirable or undesirable musical selection.

In certain other embodiments, the training data may correspond to and/or include environmental data relating to a geographical location and the known attributes may correspond to a scene at the geographical location, a current sentiment at the geographical location, mood and/or reaction of user(s) at the geographical location to a music track, the music selection, or the like (or vice versa). In yet another embodiment, the training data may correspond to and/or include user profile data and the known attribute may correspond to the user's music preferences, user's mood, user's opinion, user's current activity, user's current location, or the like (or vice versa). In other embodiments, the training data may correspond to and/or include musical selections a user likes and dislikes and the known attribute may correspond to biometric sensor data, environmental sensor data, user data, moods, emotions, opinions, scenes, etc. (or vice versa).

Referring back to FIG. 3, an interpretation module 302 receives data from the biometric sensors, the environmental sensors, and/or the user database and analyzes it using, for example, the learned models generated by the training module 301 to determine outputs such as moods, opinions, scene description, or the like, for the received data.

In some embodiments, the interpretation module 302 receives data from the biometric sensors, the environmental sensors, and/or the user database to determine the opinion of one or more users in a geographical location with respect to a music track being played in the geographical location. An opinion may be positive, negative, or neutral. An opinion has an emotional component. Examples of emotions include, but are not limited to, fear, anger, sadness, joy, disgust, trust, anxiety, anticipation, surprise, and excitement. Sometimes, an opinion can include a combination of emotions. For example, a negative opinion may include both anger and disgust. An opinion also has an intensity, which can be measured and expressed in a variety of forms. For example, an opinion may be expressed on a numerical scale of 1 to 10, as different colors, and/or different sized shapes. The overall intensity of an opinion may be a function of the intensity of each emotion associated with the opinion. For example, a moderately positive opinion can be the result of great joy tempered with moderate sadness. In some embodiments, the interpretation module 302 provides an aggregated opinion of some or all of the users in a geographical location, and is configured to adjust the generated playlist when a new user enters the location and is connected to the music service, or when any of the identified users exit the location. For example, an aggregated opinion may be happy if a majority of the users in the geographical location are exhibiting emotions corresponding to a happy opinion. Alternatively, and/or additionally, an aggregated opinion may be happy if at least a certain percentage (e.g., at least 50%) of the identified users are exhibiting emotions corresponding to a happy opinion.

In various embodiments, the interpretation module 302 also determines the current mood (or overall sentiment) of one or more users in a geographical location based on data from the biometric sensors, the environmental sensors, and/or the user database. Mood refers to the emotional state of a user and may be classified into three general moods: "good," "neutral," and "bad." Each of these types may be classified further into subtypes (e.g., categories, sub-categories, etc.). For example, "good" may be further classified into "euphoric," "happy," "cheerful," "excited," etc. The general "neutral" mood type may be further classified into subtypes of "bored," "sleepy," "calm," "contemplative," etc. The general "bad" mood type may be further classified into subtypes of "angry," "exhausted," "sick," "cranky," etc. Sometimes, a mood can include a combination of emotions. A mood also has an intensity, which can be measured and expressed in a variety of forms. For example, a mood may be expressed on a numerical scale of 1 to 10, as different colors, and/or different sized shapes. The overall intensity of a mood may be a function of the intensity of each emotion associated with the mood. For example, a moderately positive mood can be the result of great joy tempered with moderate sadness. In some embodiments, the interpretation module 302 provides an aggregated mood of some or all of the users in a geographical location, and is configured to adjust the generated playlist when a new user enters the location and is connected to the music service, or when any of the identified users exit the location. For example, an aggregated mood may be happy if a majority of the users in the geographical location are exhibiting emotions corresponding to a happy mood. Alternatively, and/or additionally, an aggregated mood may be happy if at least a certain percentage (e.g., at least 50%) of the identified users are exhibiting emotions corresponding to a happy mood.

In various embodiments, the interpretation module 302 determines an opinion of one or more users in a geographical location with respect to a music track being played in the geographical location by applying the data received from the biometric sensors, the environmental sensors, and/or the user database to the respective learned models created by the training module 301. For example, the interpretation module 302 may use the learned models to map the data received from biometric sensors, the environmental sensors, and/or the user database to specific emotions and/or opinions of a user. For example, the interpretation module 302 may determine that a listener has a positive opinion of a music track being played when an analysis of the biometric data corresponding to the listener indicates that the listener is smiling, and the learned model maps smiling to a positive emotion, opinion, and/or mood. Alternatively, the interpretation module 302 may determine that a listener has a negative opinion of a music track being played when an analysis of the biometric data corresponding to the listener indicates that the listener has a sad and/or disgusted expression, and the learned model maps sadness to a negative emotion, opinion, and/or mood. As another example, the interpretation module 302 may determine that a listener has a highly positive opinion of a music track being played when it analyzes the listeners' speech and/or conversation patterns and notes that the listeners are speaking excitedly, expressing a liking for the music track, or the like. In yet another example, the interpretation module 302 may determine a listeners' opinion of a music track being played by analyzing the listener' gestures (e.g., beating of feet), or physiology (e.g., quickened pulse, flush face, rapid breathing, pupil dilation may indicate excitement, surprise, or joy).

Examples of various biometric and environmental data that may be used to infer a mood and/or an opinion are provided below.

Hair related descriptors such as, for example, using the position of the hairline may indicate an incredulous/surprised mood when the position of the hairline is pulled back, a stressed/expressed expression when the hairline is forward, and an indeterminate mood when the hairline is in a neutral position. The presence of a hand on the head may indicate a stressed mood (e.g., pulling hair out in frustration), tired (e.g., running two hands through the hair), or 'cool' (e.g., running one hand through the hair). A presence/ type of hat indicator may indicate an athletic mood when the hat is a bowler cap (e.g., a upbeat, excited), cockiness/ arrogance (e.g., wearing a hat backwards), or formality (e.g., a Sunday bonnet).

The presence/existence/position of wrinkles may indicate mood and/or state, for example, pain when wrinkles appear in the cheek, happiness when angled wrinkles appear around a smile, skepticism/bewilderment when wrinkles appear in the forehead, and unease when concentric wrinkles appear around the mouth.

The presence/position of facial muscles and/or of tension in the muscles may be used to indicate intensity or determination when the lateral facial or forehead muscles are tense, or relaxedness/contentment when the muscles are not being used. The orientation of the eye structure may indicate unease/skepticism with a squint, shock or disbelief with an open eye structure, anger with a slight squint, and a neutral or content mood with a normal eye orientation. Eye structure may be determined by identifying the relative positioning between constituent components (e.g., eyelash, eye line, eye-originating wrinkles, and/or the eye itself).

The brow may indicate anger/skepticism/dislike when furrowed, surprise when raised, and neutrality/happiness when raised. The angle of a furrow may indicate an intensity and/or distinguish between anger/skepticism/dislike.

The mouth structure may indicate whether a user is responsive to a content selection by mouthing the words, such as the case when the facial structure changes at a frequency appearing in a content selection. The angle of the lips and side of the mouth and the presence of teeth may further refine/identify a mood. A smile may indicate happiness, a frown may indicate unhappiness, yelling may indicate anger, and clenched lips may indicate intensity or discomfort.

The movement of feet at a frequency appearing in the content selection may be indicative of a positive opinion regarding the content selection.

A change in body temperature may indicate whether a user is responsive to content selection.

A positive, negative and/or neutral inference may be applied to sample conversations between one or more users in the geographical location, and the mood and/or or opinion of the users may be inferred from the conversations (and/or words used). As used herein, the term "conversation" is defined as a verbal or textual exchange of information between two or more parties. For example, a speech analysis system may analyze the textual content, speed, volume, timing, etc., of speech input and text, which can be used as feedback for the interpretation module for determining opinion and/or mood of the user(s). All the conversations may be analyzed to determine an overall mood of the users in a geographical location. Alternatively, and/or additionally, a subset of conversations found to be related to the current music track and/or playlist may be analyzed to determine the user(s) opinion regarding the current music track. For example, utterance of certain keywords such as "terrific", "cool", "enjoy", etc. in relation to the music being played may be interpreted as a positive opinion.

In some embodiments, the interpretation module 302 also analyzes the data from the biometric sensors, the environmental sensors, and/or the user database to determine the current "scene" at a geographical location. As used in this document, "scene" refers to a categorization of a geographical location based on a collection of location based characteristics. Examples of the characteristics may include, without limitation, geographical coordinates, weather, ambient light, activity (or activities) related to a location, number of users, user activity, presence or absence of one or more objects at the location, or the like. In some embodiments, the interpretation module 302 may determine the scene at a geographical location by applying the data received from the biometric sensors, the environmental sensors, and/or the user database to the respective learned models created by the training module 301. For example, the interpretation module 302 may use the learned models to map the data received from biometric sensors, the environmental sensors, and/or the user database to determine specific location based characteristics and map the location based characteristics to determine scene categories. For example, the interpretation module 302 may use the data received from the biometric sensors, the environmental sensors, and/or the user database to determine that a majority of the users at a geographical location are engaged in eating and/or drinking, and use the determined activity to categorize the location as a restaurant. In another example, if demographic information regarding one or more users from the user database provides information relating to the occupation of the users as being hair stylists, the interpretation module may characterize the location as a hair salon. Other location characteristics such as the time of the day, temperature, ambient light, number of users etc. may be included in the location categorization to provide an overall scene description.

In various embodiments, the recommendation engine may also include a music classifier module 304 that may provide enhanced metadata attributes for the music tracks accessible by the player device by classifying music tracks into different mood categories such as happy, ecstatic, content, sad, depressed, nervous, angry, bored, tired, hyper, excited, grumpy, or aggressive. For example, a given song may be a ballad, have a genre, have a tempo, or a relative tempo to its genre, may be in either a "happy" key, a "pensive" key, or a "melancholy" one, to list just a few examples of the many ways one may characterize a song. In some embodiments, the music classifier 304 may also provide enhanced metadata attributes for the music tracks accessible by the player device by classifying music tracks into different scene categories such as, background music tracks for playing in a restaurant during daytime, dance music tracks for playing in a dance club, music tracks for playing at museum, music track for playing at an activity center, or the like. In exemplary embodiments of the system, a music classification process can be implemented by humans, by automated processes (using now or hereafter known methods), or by various combinations of both. For example, mood-based classification and/or scene-based classification of music tracks can be performed using learned models generated by the training module 301 (as discussed above) in order to classify a music track into one or more mood categories and/or scene categories.

Referring back to FIG. 3, a recommendation module 303 may receive, from the interpretation module, information relating to the opinion of one or more users in a geographical location regarding a music track being played, current mood of the one or more users in the geographical location, and current scene at the geographical location, and analyze the received information to provide a recommendation for the next music track to be played by the player device and/or whether or not the current music track should be removed from a playlist. The recommendation module may also take into account the available music tracks (including their metadata and classification) as well as the user profiles of the one or more users to make the recommendation. In some embodiments, the recommendation module 303 may use the learned models generated by the training module 301 for correlating a value or range of values calculated based on one or more sensed environmental factors, biometric factors, and user profiles to a value or a range of values for metadata attributed to the available music tracks. In other embodiments, the recommendation module 303 may use the learned models generated by the training module 301 for mapping information relating to the opinion of one or more users in a geographical location regarding a music track being played, current mood of the one or more users in the geographical location, current scene at the geographical location, and/or a value or range of values calculated based on a combination thereof, to values or ranges of values for metadata attributed to the available music tracks. For example, the generated learned models may comprise one or more rules for including (or excluding) content items from a subset of content items from which the recommendation module selects items for output on the player device.

In an exemplary embodiment, one or more functions performed by various modules of the recommendation engine (as discussed above) may utilize an International Business Machine (IBM) Watson™ system. Watson is a question answering (QA) system (i.e., a data processing system) that applies advanced natural language processing, information retrieval, knowledge representation, automated reasoning, and machine learning technologies to the field of open domain question answering. The IBM Watson™ QA system is available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012. The Watson system employs more than one-hundred different algorithms to analyze natural language, identify sources, find and generate hypotheses, find and score evidence, and merge and rank hypotheses.

The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware. The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of a million books, per second. Sources of information for the Watson system include encyclopedias, dictionaries, thesauri, newswire articles, and literary works. The Watson system also uses databases, taxonomies, and ontologies.

Referring back to FIG. 1, the player device 120 may include one or more electronic devices capable of accessing content from a music database (or content source) directly and/or via the music classifier engine, based on a recommendation from the recommendation engine, and playing the recommended music track. The player device is further described in detail below with respect to FIG. 5 below.

Figure 4:
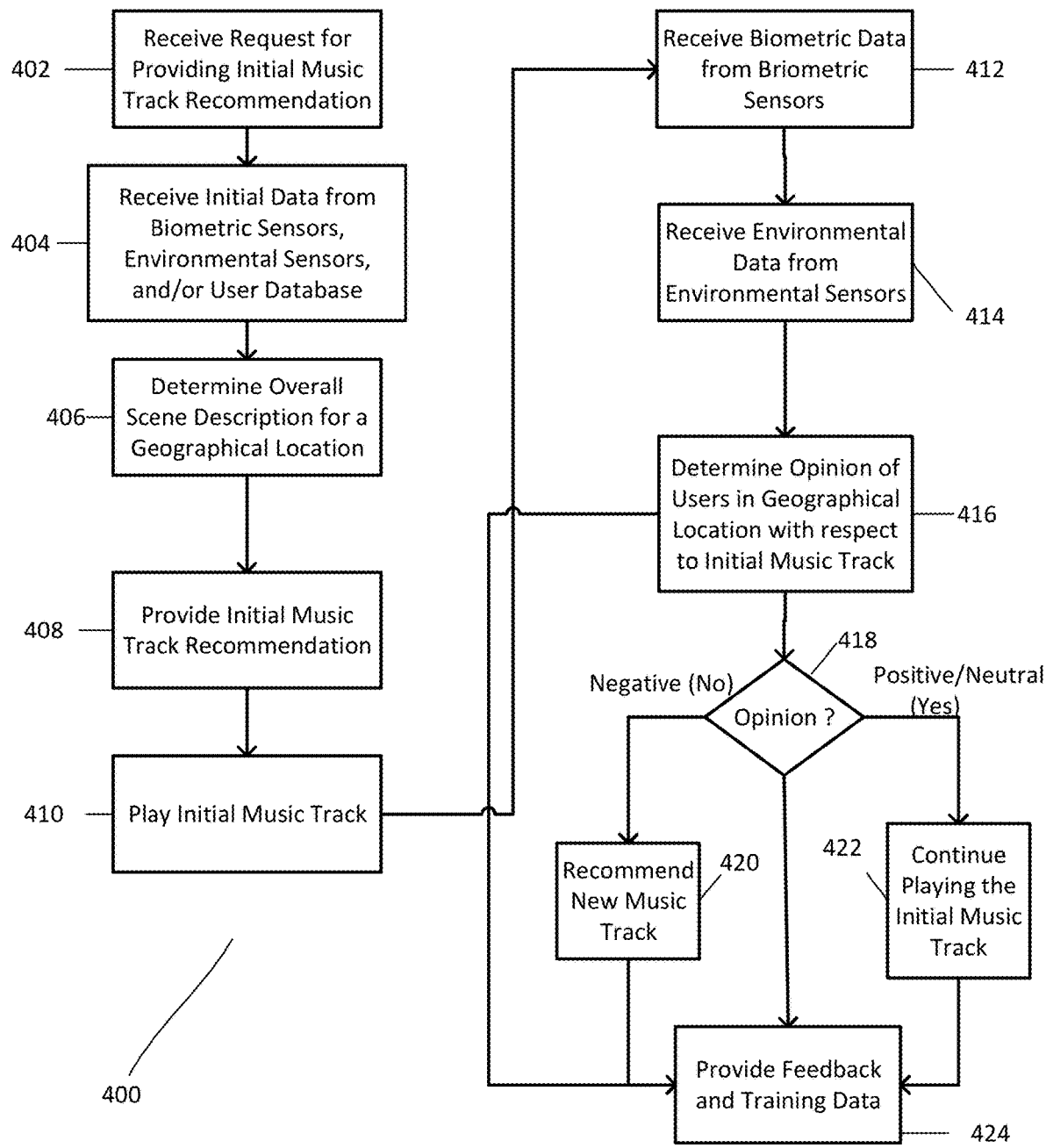
FIG. 4 is a flowchart illustrating an embodiment of a method for providing a music track recommendation based on user mood and ambient environment.

Referring now to FIG. 4, a flowchart for an embodiment of a method for providing a music track recommendation based on user mood and ambient environment, generally designated 400 is illustrated. While the recommendation method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, or the steps may be performed in the order disclosed or in an alternate order.

As shown in FIG. 4, at 402, the system may receive a request for providing an initial music track and/or playlist recommendation for a player device in a geographical location. In response to receiving the request, at 404 the system may receive initial data from one or more biometric sensors, one or more environmental sensors, and/or the user database to determine and/or categorize the geographical location and determine an overall scene description at 406 for the geographical location, as discussed above. The system at 408 may then determine the initial music track and/or playlist recommendation for the player device in the geographical location. The system may make the initial recommendation by mapping a value or range of values calculated based on the overall scene description to values or ranges of values for metadata attributed to the available music tracks. For example, the system may identify the scene as a restaurant during lunch time and may recommend a background music track based on the metadata attributed to the available music tracks.

In some embodiments, system may receive user data corresponding to one or more users identified by the system to be physically present in the geographical location. In an examplary embodiment, the system may determine that a user is physically present in a geographical location based on the identification of a user device associated with the user in the geographical location, for example, using a location sensor of the user device, Wi-Fi triangulation, or the like. Other methods of identifying users physically present in the geographical location are within the scope of this disclosure.

It should be noted that the system may be initiated upon receipt of an initial music track to be played in a geographical location directly from a user. That is a user in the geographical location may select the first music track(s).

At 410, the player device may retrieve (from a music database) and play the recommended music track and/or a music track within the recommended playlist.

At 412, the system may receive biometric data from one or more biometric sensors, corresponding to one or more users in the geographical location. At 414, the system may receive environmental data corresponding to the geographical location from one or more environmental sensors. The system at 416 may then determine the overall opinion of the one or more users in the geographical location regarding the recommended initial music track. For example, as discussed above, the opinion may be negative, positive, or neutral and may be determined based on one or more of biometric data (e.g., facial expressions, gestures, body temperature, etc.), environmental data (such as conversation analysis), user data, mood or sentiment analysis, or the like.

At 418, the system analyzes the overall opinion to determine whether it is positive, negative or neutral. If the system at 418 determines that the overall opinion of the one or more users in the geographical location regarding the recommended initial music track is positive and/or neutral (YES), the system at 422 may continue playing the recommended initial music track, and optionally may recommend a next music track with similar metadata attributes (or values) as that of the initial music track to be played by the player device.

However, if the system at 418 determines that overall opinion of the one or more users in the geographical location has a negative impression and/or opinion of the recommended initial music track, the system at 420 may recommend a different music track to be played by the player device, either immediately and/or after the current music track has finished playing. In some embodiments, the new recommendation may be based on one or more of the following: an overall scene description (current or initial), a current mood of the one or more users, user profile(s) of the one or more users, and/or metadata attributes of the initial music track. As discussed above, the system may determine the scene description and/or the current mood of the one or more users based on, for example, biometric data, environmental data, and/or user data.

The above steps (412-422) may be repeated at specific time intervals (such as 10 seconds, 60 seconds, 120 seconds or the like) to provide a music track recommendation based on the current opinion, mood and/or scene at a geographical location.

In various embodiments, at steps 418, 420, and/or 422, the system may provide feedback and training data in the form of collected biometric data, environmental data, user profile, music track attributes, etc. as training data with known attributes corresponding to the mood, opinion, and/or scene descriptions (or vice versa) for enhancing the leaning models.

Figure 5:
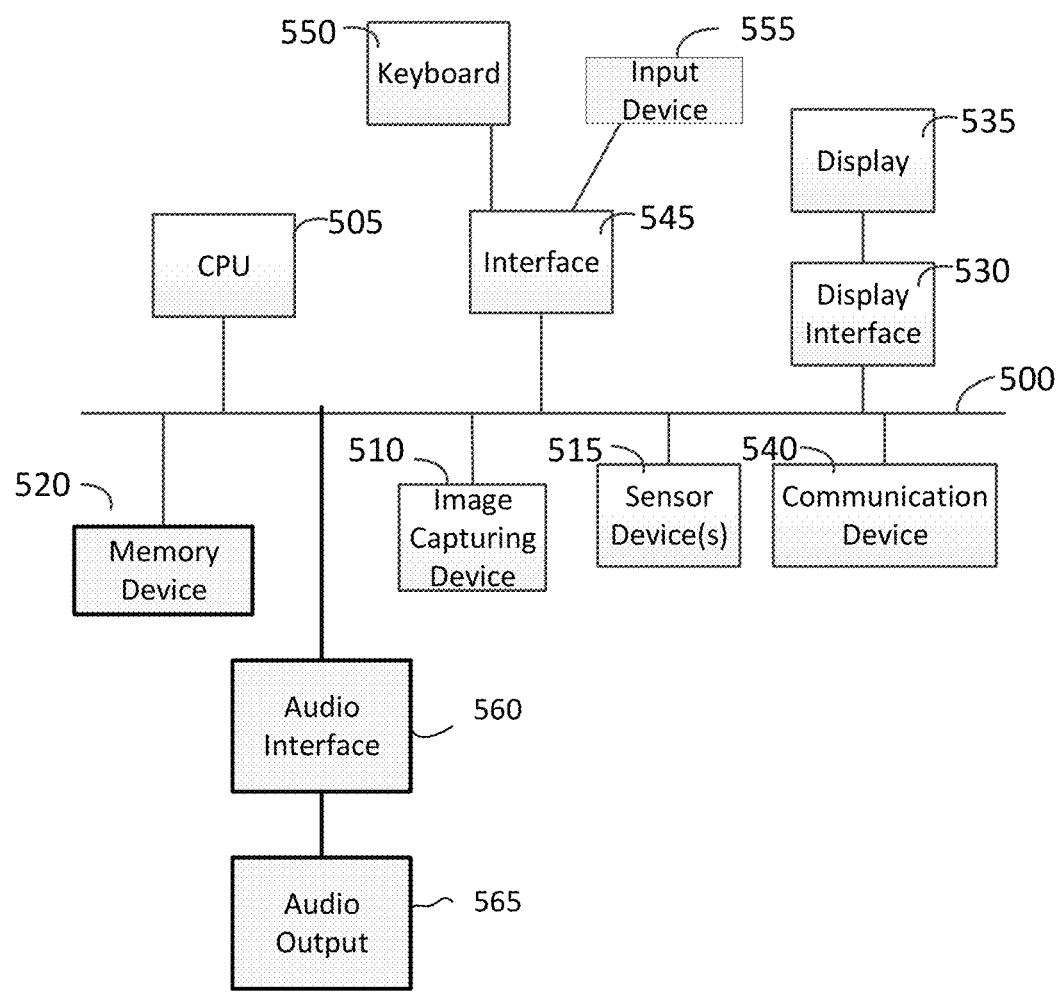
FIG. 5 is a block diagram depicting a player device configuration according to one embodiment.

FIG. 5 depicts an example of internal hardware that may be included in any of the electronic components of the player device and/or various user devices in the system. The hardware may be used to contain or implement program instructions, such as those of a cloud-based server, electronic device, virtual machine, or container. A bus 500 serves as an information highway interconnecting the other components of the hardware. The bus may be a physical connection between elements of the system, or a wired or wireless communication system via which various elements of the system share data. Processor 505 is a processing device that performs calculations and logic operations required to execute a program. Processor 505, alone or in conjunction with one or more of the other elements disclosed in FIG. 5, is an example of a processing device, computing device or processor as such terms are used within this disclosure. The processing device may be a physical processing device, a virtual device contained within another processing device, or a container included within a processing device.

A memory device 520 is a hardware element or segment of a hardware element on which programming instructions, data, or both may be stored. Read only memory (ROM) and random access memory (RAM) constitute examples of memory devices, along with cloud storage services.

An optional display interface 530 may permit information to be displayed on the display 535 in audio, visual, graphic or alphanumeric format. An audio interface 560 may permit audio information to be broadcasted via an audio output 565 such as speaker, microphones, etc.

Communication with external devices, such as sensors, database servers, etc. may occur using various communication devices 540, such as a communication port or antenna. A communication device 540 may be communicatively connected to a communication network, such as the Internet or an intranet.

The hardware may also include a user input interface 545 which allows for receipt of data from input devices such as a keyboard or keypad 550, or other input device 555 such as a mouse, a touch pad, a touch screen, a remote control, a pointing device, a video input device and/or a microphone. Data may also be received from an image capturing device 510 (e.g., digital camera or video camera), or other sensor devices (such as biometric sensors, environmental sensors, etc. described above).

As will be appreciated by one skilled in the art, aspects of the present invention may be embodied as a system, a method, and/or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as the recommendation engine 110 of FIG. 2 or the bus 500 of FIG. 5. The memory elements can include local memory employed during actual execution of the program code, such as memory device 520 of FIG. 5 and/or nonvolatile memory 204 of FIG. 2, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-executed method for providing a music track for playing in a geographical location by an electronic player device, the method comprising:
    providing one or more electrical biometric sensors configured to sense biometric data from each one of a group of two or more people in a geographical location;
    providing an electrical environmental sensor for sensing environmental data corresponding to the geographical location;
    receiving, by an interpretation module from the one or more electrical biometric sensors, biometric data sensed by the one or more electrical biometric sensors from each one of the group of the two or more people in the geographical location, wherein the interpretation module resides in a recommendation engine and contains a processor having circuitry and logic that performs calculations and logic operations;
    receiving, by the interpretation module from the electrical environmental sensor, environmental data corresponding to the geographical location;
    analyzing, by the interpretation module, the biometric data received by the one or more electrical biometric sensors from each one of the group of the two or more people in the geographic location and the environmental data corresponding to the geographical location;
    determining by the interpretation module, based at least in part on the analysis of the biometric data and the environmental data, an aggregate likeness index with respect to a current music track being played in the geographical location, wherein the determined aggregate likeness index is based at least in part on processing in the interpretation module all the biometric data received by the one or more electrical biometric sensors from each one of the group of the two or more people in the geographical location;
    receiving, by a recommendation module from the interpretation module, the determined aggregate likeness index, wherein the recommendation module resides in a recommendation engine and contains a processor having circuitry and logic that performs calculations and logic operations; and
    providing an instruction from the recommendation module to the electronic player device relating to the current music track being played based on the determined aggregate likeness index, the electronic player device containing a processor having circuitry and logic that performs calculations and logic operations to play the music track.

2. The method of claim 1, wherein the instruction comprises identifying a music track other than the current music track being played in the geographical location.

3. The method of claim 1, wherein the biometric data comprises at least one of the group consisting of a physical characteristic, a physiological characteristic, a behavioral characteristic, and combinations thereof, of each one of the two or more people in the geographical location.

4. The method of claim 1, wherein the environmental data comprises at least one of the group consisting of location coordinates, data relating to weather conditions, visual data, audio data, ambient light, or ambient temperature, and combinations thereof.

5. The method of claim 1, wherein determining the aggregate likeness index comprises analyzing the biometric data and the environmental data to output a prediction of the aggregate likeness index based on one or more learning models created by a training module residing in the recommendation engine and having a processor having circuitry and logic that performs calculations and logic operations, wherein the training module analyzes training data to create the one or more learning models.

6. The method of claim 1, wherein determining the aggregate likeness index further comprises analyzing user data corresponding to each one of the group of two or more people, wherein the user data comprises at least one of the group consisting of demographic information, social-economic information, location information, music preference information, listening history, social media activity, and combinations thereof.

7. The method of claim 2, wherein the recommendation of the other music track is based on at least one of the following: an overall mood in the geographical location or the scene description corresponding to the geographical location.

8. A computer-executed method for providing a music track for playing within a geographical location by an electronic player device, the method comprising:
    providing one or more electrical biometric sensors configured to sense biometric data from each one of a group of two or more people in a geographic location;
    providing an electrical environmental sensor for sensing environmental data corresponding to the geographical location;
    receiving, by an interpretation module from the one or more electrical biometric sensors, biometric data sensed by the one or more electrical biometric sensors from each one of the group of the two or more people in the geographical location, the interpretation module residing in a recommendation engine and containing a processor having circuitry and logic that performs calculations and logic operations;

receiving, by the interpretation module from the electrical environmental sensor, environmental data corresponding to the geographical location;

analyzing, by the interpretation module, the biometric data received by the one or more electrical biometric sensors from each one of the group of the two or more people in the geographical location and the environmental data corresponding to the geographical location;

determining by the interpretation module, based at least in part on the analyzed biometric data received by the one or more electrical biometric sensors from each one of the group of the two or more people in the geographical location and the environmental data, a current scene description for the geographical location, wherein a scene description refers to a categorization of a geographical location based upon a collection of location-based characteristics;

receiving, by a recommendation module from the interpretation module, the scene description, wherein the recommendation module resides in the recommendation engine and contains a processor having circuitry and logic that performs calculations and logic operations;

providing, by the recommendation module to the electronic player device for playing digital music tracks in the geographical location, a music track based on the current scene description, wherein the electronic player device contains a processor having circuitry and logic that performs calculations and logic operations.

9. The method of claim 8, wherein determining the current scene description further comprises analyzing user data corresponding to each one of the group of the two or more people in the geographical location, and wherein determining the aggregate likeness index comprises analyzing the biometric data and the environmental data to output a prediction of the aggregate likeness index based on one or more learning models created by a training module residing in the recommendation engine and having a processor having circuitry and logic that performs calculations and logic operations, wherein the training module analyzes training data to create the one or more learning models.

10. The method of claim 8, wherein the biometric data comprises at least one of the group consisting of a physical characteristic, a physiological characteristic, a behavioral characteristic, and combinations thereof, of each one of the group of the two or more people in the geographical location.

11. The method of claim 8, wherein the environmental data comprises at least one of the group consisting of location coordinates, data relating to weather conditions, visual data, audio data, ambient light, or ambient temperature, and combinations thereof.

12. The method of claim 8, wherein the location-based characteristics comprise at least one of the group consisting of geographical coordinates in the geographical location, weather in the geographical location, ambient light in the geographical location, activity in the geographical location, activity of each one of the group of the two or more people in the geographical location, number of people in the group of the two or more people in the geographical location, presence of objects in the geographical location, and combinations thereof.

13. A computer-executed system for providing a digital music track for playing in a geographical location by an electronic player device, the system comprising:

an electronic player device for playing digital music tracks, the electronic player device containing a player processor and having circuitry and logic for performing calculations and logic operations for playing digital music tracks;

one or more biological sensors configured to sense biometric data from each one of a group of one or more people in the geographical location; and a recommendation engine containing a recommendation module and an interpretation module, the interpretation module containing an interpretation processor device having interpretation module circuitry and logic, the interpretation module having a non-transitory, computer-readable memory containing programming instructions that when executed by the interpretation processor device are configured to cause the interpretation processor device to:

receive, from the one or more electrical biometric sensors, biometric data sensed by the one or more electrical biometric sensors from each one of the group of one or more people in the geographical location;

receive, from an electrical environmental sensor, environmental data corresponding to the geographical location;

analyze the biometric data received from the one or more electrical biometric sensors from each one of the group of the one or more people in the geographical location and the environmental data corresponding to the geographical location; and determine, based at least in part on the analysis of the biometric data and the environmental data, an aggregate likeness index with respect to a current music track being played in the geographical location, wherein the determined aggregate likeness index is based at least in part on processing in the interpretation module all the biometric data received by the one or more electrical biometric sensors from each one of the group of the one or more people in the geographical location; and the recommendation module containing a recommendation processor having circuitry and logic, the recommendation module having a non-transitory, computer readable memory containing program instructions that when executed are configured to cause the recommendation processor to:

receive the determined aggregate likeness index and provide a recommendation instruction to the electronic player device relating to the current music track being played based on the determined aggregate likeness index.

14. The system of claim 13, wherein the recommendation instruction comprises program instructions that when executed are configured to cause the recommendation processor to identify a music track other than the current music track being played by the player device in the geographical location.

15. The system of claim 13, wherein the recommendation engine further comprises a training module containing a training processor having circuitry and logic, the training module having non-transitory, computer readable memory containing programming instructions that when executed are configured to cause the training processor to analyze training data to create one or more learning modules, and wherein determining the determined aggregate likeness index comprises programming instructions that when executed by the interpretation processor device are configured to cause the interpretation processor device to analyze the biometric data and the environmental data to output a prediction of the determined aggregate likeness index based on the one or more learning models.

16. The system of claim 13, wherein determining the aggregate likeness index further comprises programming instructions that when executed by the interpretation-processor device are configured to cause the interpretation processor device to analyze user data corresponding to each one of the group of the one or more people in the geographical location, wherein the user data comprises at least one of the group consisting of demographic information, social-economic information, location information, music preference information, listening history, social media activity, and combinations thereof.

17. The method of claim 1, wherein determining the aggregate likeness index comprises comparing the biometric data and the environmental data to values saved in at least one of a group consisting of memory, tables, cache, and combinations thereof.

18. The method of claim 1, wherein the one or more electrical biometric sensors comprise at least one of the group consisting of a pressure sensor, a motion sensor, a pulse rate sensor, a temperature sensor, a microphone, a camera, and combinations thereof; and the electrical environmental sensor comprises at least one of a group consisting of a global positioning system, a weather collection system, a camera, a microphone, a photosensor, a temperature sensor, and combinations thereof.

19. The method of claim 13, wherein determining the aggregate likeness index comprises programming instructions that when executed by the interpretation processor device are configured to cause the interpretation processor device to compare the biometric data and the environmental data to values saved in at least one of a group consisting of memory, tables, cache, and combinations thereof.

20. The method of claim 13, wherein the one or more electrical biometric sensors comprise at least one of the group consisting of a pressure sensor, a motion sensor, a pulse rate sensor, a temperature sensor, a microphone, a camera, and combinations thereof; and the electrical environmental sensor comprises at least one of a group consisting of a global positioning system, a weather collection system, a camera, a microphone, a photosensor, a temperature sensor, and combinations thereof.

* * * * *